(No Model.)

F. P. BOLAND.
COFFEE POT.

No. 501,672. Patented July 18, 1893.

Witnesses.
Richmond P. Ernst
George P. Cressy

Inventor.
Frank P. Boland
per D. M. Small, his atty

UNITED STATES PATENT OFFICE.

FRANK P. BOLAND, OF PROVIDENCE, RHODE ISLAND.

COFFEE-POT.

SPECIFICATION forming part of Letters Patent No. 501,672, dated July 18, 1893.

Application filed March 14, 1893. Serial No. 465,890. (No model.)

*To all whom it may concern:*

Be it known that I, FRANK P. BOLAND, of the city and county of Providence, in the State of Rhode Island, have invented an Improvement in Coffee-Pots of the Class Having a Separate Compartment for the Coffee, of which the following is a specification.

My improvement relates to the construction of this compartment and of a device for securing the strainer thereto, as hereinafter set forth.

Figure 1:
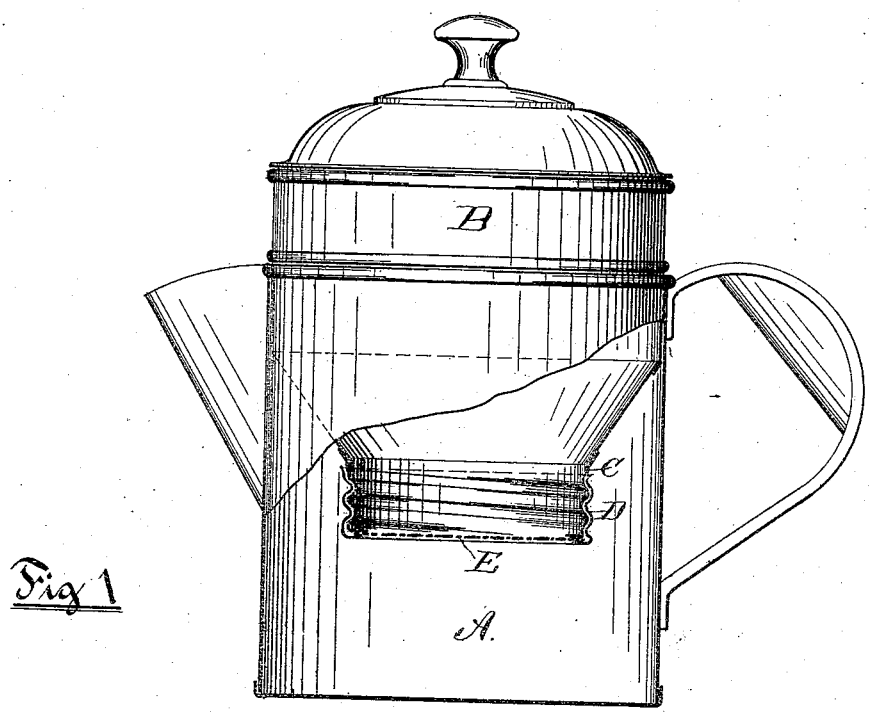
Figure 2:
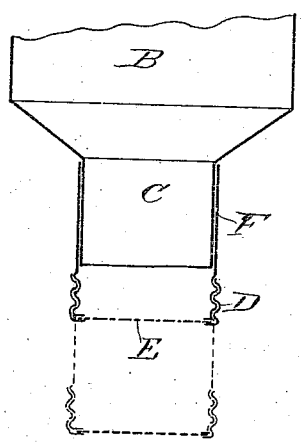

In the accompanying drawings, which form a part of this specification, Figure 1 is a side view of coffee-pot entire, it being partly broken away to show my improvement. Fig. 2 shows a modification thereof.

A represents the body of the coffee-pot, B the receptacle for the coffee, being a detachable compartment having a funnel-shaped base with contracted neck C which may extend down as near to, or as far above, the bottom of the pot proper, as desired. It should be above water-line therein when powdered coffee is to be used and below when coffee is to be boiled, as necessary if coarser. To meet requirements in both of these cases, the neck, C should be made extensible by means of a sliding sleeve F shown in Fig. 2. This neck or sleeve is preferably constructed with a thread, the strainer E being secured thereto by means of a removable collar D having a corresponding thread.

By above construction, a small strainer of cloth or other material can be used (which is sufficient), firmly held in position and easily removed when desired, for cleansing or renewal.

I claim as my invention—

1. A coffee pot constructed with a receptacle B having a funnel-shaped base and a contracted neck C grooved to form a thread, also having a collar D with corresponding thread, for securing strainer to bottom of this neck, all in combination substantially as described.

2. A coffee pot constructed with a receptacle B having a funnel-shaped base and a contracted neck C to which is secured a sliding sleeve grooved at bottom to form a thread, and collar D with corresponding thread, all in combination substantially as and for the purpose set forth.

FRANK P. BOLAND.

Witnesses:
DEXTER M. SMALL,
GEORGE L. ROCKWELL.